(No Model.)  2 Sheets—Sheet 1.
J. M. BLAKE.
COMBINED POTATO PLANTER AND CULTIVATOR.
No. 525,068.   Patented Aug. 28, 1894.
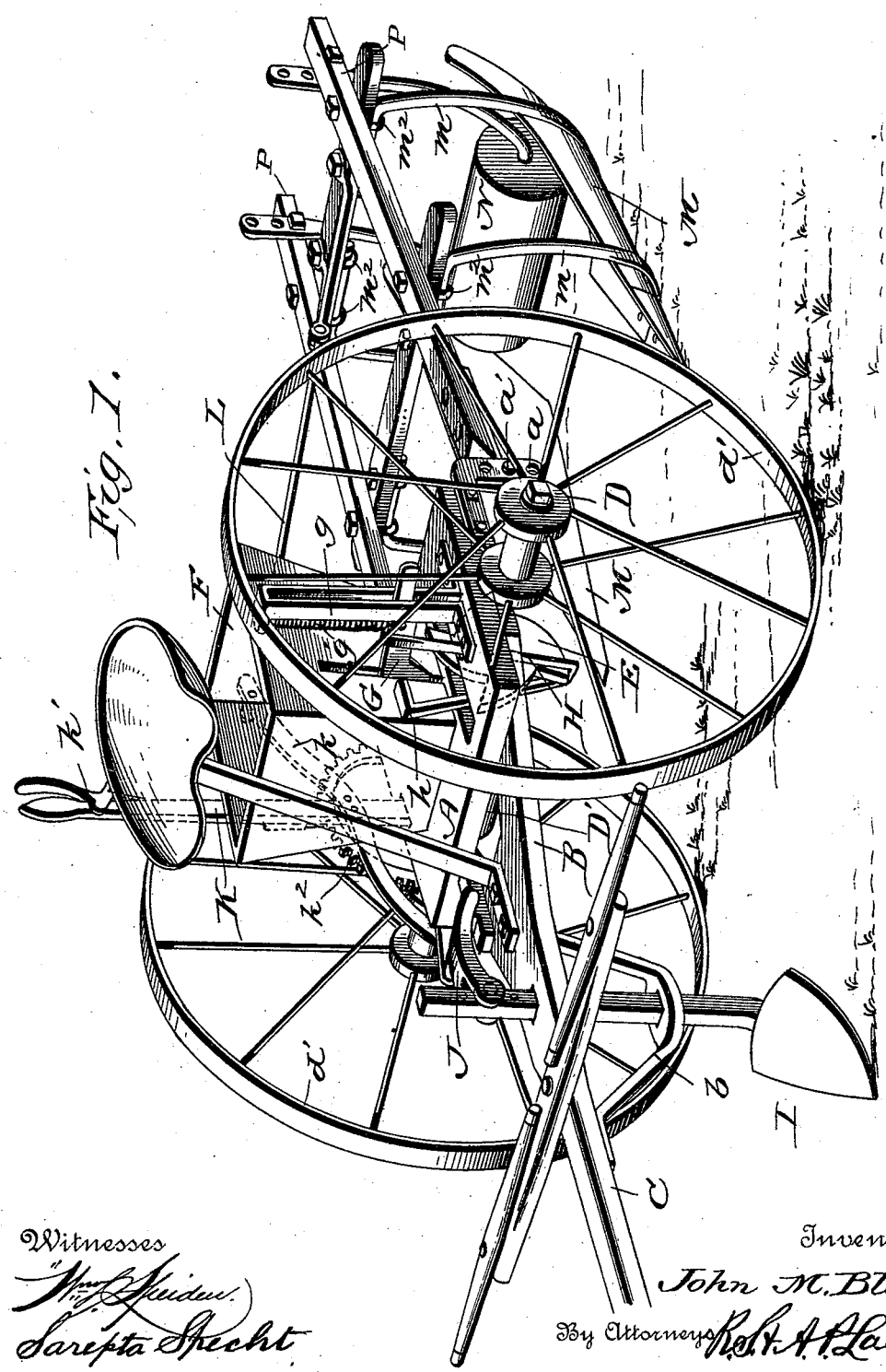

(No Model.) 2 Sheets—Sheet 2.
J. M. BLAKE.
COMBINED POTATO PLANTER AND CULTIVATOR.
No. 525,068. Patented Aug. 28, 1894.
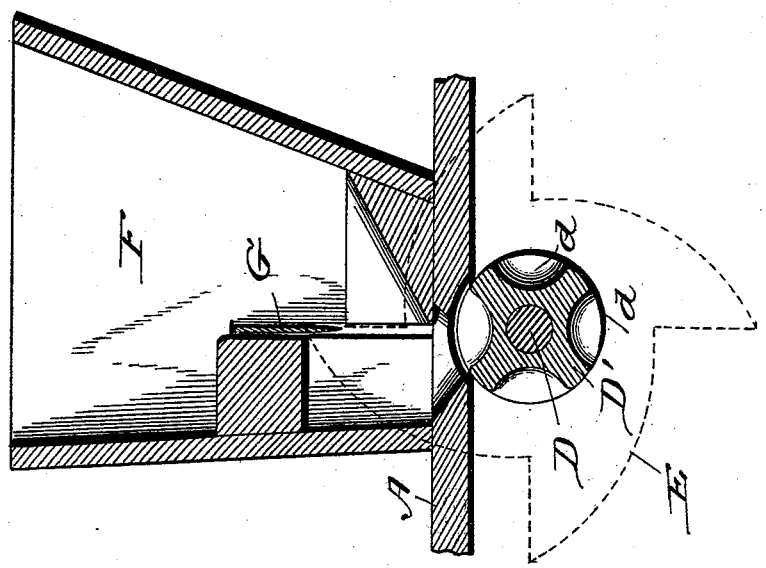
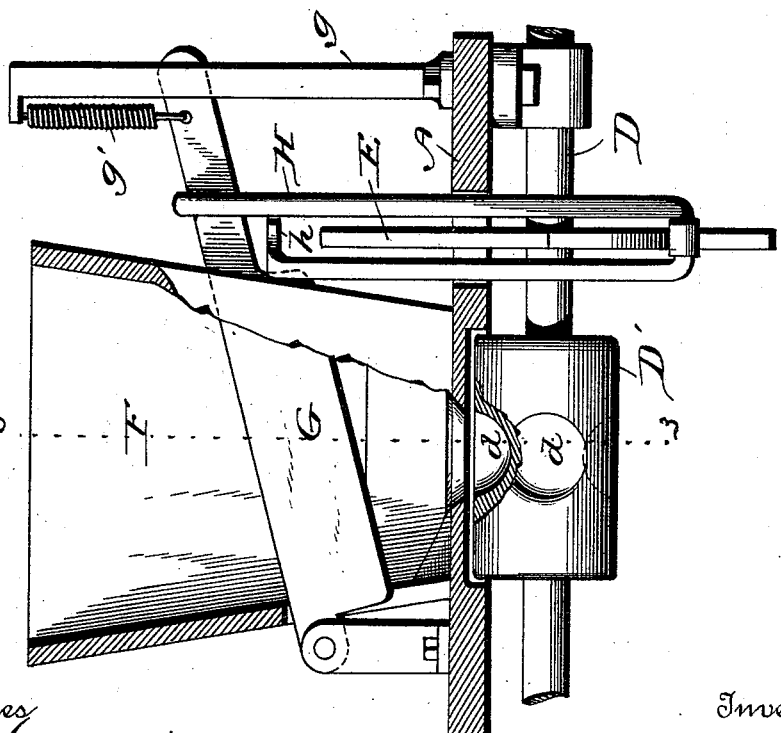

UNITED STATES PATENT OFFICE.

JOHN MURRAY BLAKE, OF ELDRED, PENNSYLVANIA.

COMBINED POTATO PLANTER AND CULTIVATOR.

SPECIFICATION forming part of Letters Patent No. 525,068, dated August 28, 1894.

Application filed October 18, 1893. Serial No. 488,507. (No model.)

*To all whom it may concern:*

Be it known that I, JOHN MURRAY BLAKE, a citizen of the United States, residing at Eldred, in the county of McKean, State of Pennsylvania, have invented certain new and useful Improvements in a Combined Potato Planter and Cultivator; and I do hereby declare the following to be a full, clear, and exact description of the invention, such as will enable others skilled in the art to which it appertains to make and use the same.

This invention relates to a combined potato planter and cultivator, the object being to provide a machine for automatically opening the earth, chopping the potatoes, planting and covering the same and pressing the earth in the furrow.

The improvement consists of the novel features and the peculiar construction and combination of the parts which will be hereinafter more fully described and claimed and which are shown in the annexed drawings, in which—

Figure 1 is a perspective view of a machine embodying my invention. Fig. 2 is a sectional detail view of the potato cutting mechanism. Fig. 3 is a sectional view on the line 3—3 of Fig. 2.

The platform A is supported on the draft frame B which is attached to or forms part of the tongue C to which the double tree and single trees of ordinary construction are attached in the usual manner. The axle D is journaled near its ends in bearing boxes provided on the draft frame B and is provided midway of its ends with a feeding cylinder D' having a series of cavities $d$ into which the seed is received from the hopper and dropped into the furrow in the ground. The wheels $d'$ are mounted on the spindles at the ends of the axle in the usual manner so as to impart a rotary movement to the said axle as the machine is drawn over the field. A cam E is attached to and rotates with the axle and is constructed to operate the cutting mechanism for dividing the potatoes into suitable portions for planting. The hopper F is mounted upon the platform A and is provided in its sides with slits through which the knife G extends and is adapted to work vertically. This knife is pivoted at one end and its opposite end extends through parallel guides $g$ by means of which it is guided in its vertical movements. A spring $g'$ connects the free ends of the knife with the upper ends of the guides $g$ and serves to hold and return the knife to an elevated position after being depressed for cutting the potatoes. An operating rod H is attached at its upper end to the knife G and is constructed to be acted upon by the cam E so as to vibrate the knife G in the efficient operation of the machine. As shown, this rod H projects below the lower portion of the cam E and is bent and extends vertically and terminates in a foot rest $h$ which is located within convenient reach of the driver's seat to be pressed upon to hold the knife at its lowest position when required. The cam E is provided with a plurality of cam portions which are so spaced apart as to operate the knife at proper intervals to cut up the potatoes into the required size.

The furrow opener I is a cultivator plow of ordinary construction having its standard working through the tongue or draft frame and a bracket $b$ depending therefrom. A lever J having its end portion located in a different plane is journaled to the draft frame midway of its ends, one end being adjustably connected to the standard of the opener I, the other end being connected with an arm extending from the hand lever K. This lever K is provided with the usual hand latch $k'$ by means of which it is held in the adjusted position, the said latch engaging with a notched segment $k^2$ on the draft frame.

The cultivating and covering devices are carried by beams P which are pivotally connected at their forward ends to pendent brackets $a$ at the rear end of the draft frame. These brackets are composed of parallel portions between which the ends of the side bars of the said cultivating attachment are inserted and held by pins $a'$. A rod L connected at its rear end to braces extending upward from the cultivator frame is adjustably attached at its front end to a rear extension of an arm $k$ whereby the cultivator or coverer is simultaneously elevated with the opener on operating the hand lever K when it is desired to raise both out of the ground as when making a curve or for other purposes. The mold board or covering shovel M is attached to the lower end of rods or standards $m$ which have their upper ends bent approximately at a right angle and pass through eye bolts $m^2$ by means of which the said standards are adjustably connected to the cultivator frame so as to permit the adjustment of the said covering shovels to and from each other to adapt their relative distance apart to the size of the row to be covered or cultivated. The roller N located in the space between the covering shovel and mounted upon swinging arms is provided to press the earth on the planted seed.

In the operation of the machine the potatoes to be planted are placed in the hopper F and as the machine is drawn over the field the knife G is vibrated a sufficient distance to cut or chop the potatoes into the required size for planting, the knife being actuated by means of the cam E and the operating rod H in the manner herein set forth.

When it is desired to operate the knife independently of the cam E or hold the same at its lowest position, the driver presses upon the foot piece $h$ provided on the recurved portion of the operating rod as herein set forth. On operating the lever K the opener I and the covering attachment are simultaneously elevated from the ground. This operation is only necessary when reaching the end of a row to facilitate the turning to plant a new row or at such times when it is desired to move the machine over the field or road without performing new work.

Having thus described my invention, what I claim, and desire to secure by Letters Patent, is—

1. In a planter, the combination with a hopper, of a knife extending across the hopper and pivoted at one end and adapted to have a vibratory movement at its opposite end, and a cam on a power driven shaft adapted to engage with and operate the free end of the said knife, substantially as and for the purpose set forth.

2. In a planter, the combination with a hopper, of a cutter adapted to operate vertically, a cam, and an operating rod connected with the said cutter at one end and having its opposite end recurved to engage with the cam, and having the recurved end terminating in a foot rest within convenient reach of the driver's seat, substantially as set forth for the purpose described.

3. In a planter the combination with a hopper a rotating feeding cylinder having cavities in its periphery, a knife working vertically in the said hopper, a spring for holding and returning the knife to an original position, a cam mounted on the same shaft with the planting cylinder, and an operating rod attached at its upper end to the said knife and having its lower end bent and extended vertically and terminating in a foot rest, substantially as set forth.

In testimony whereof I affix my signature in presence of two witnesses.

JOHN MURRAY BLAKE.

Witnesses:
EZRA MARSH,
C. E. SQUIRES.